Dec. 2, 1958 D. T. AYERS, JR 2,862,477
FLUID PRESSURE MOTOR VALVE MECHANISM
Filed Oct. 29, 1956 4 Sheets-Sheet 1

INVENTOR
DAVID T. AYERS JR.

BY *John F. Phillips*
ATTORNEY

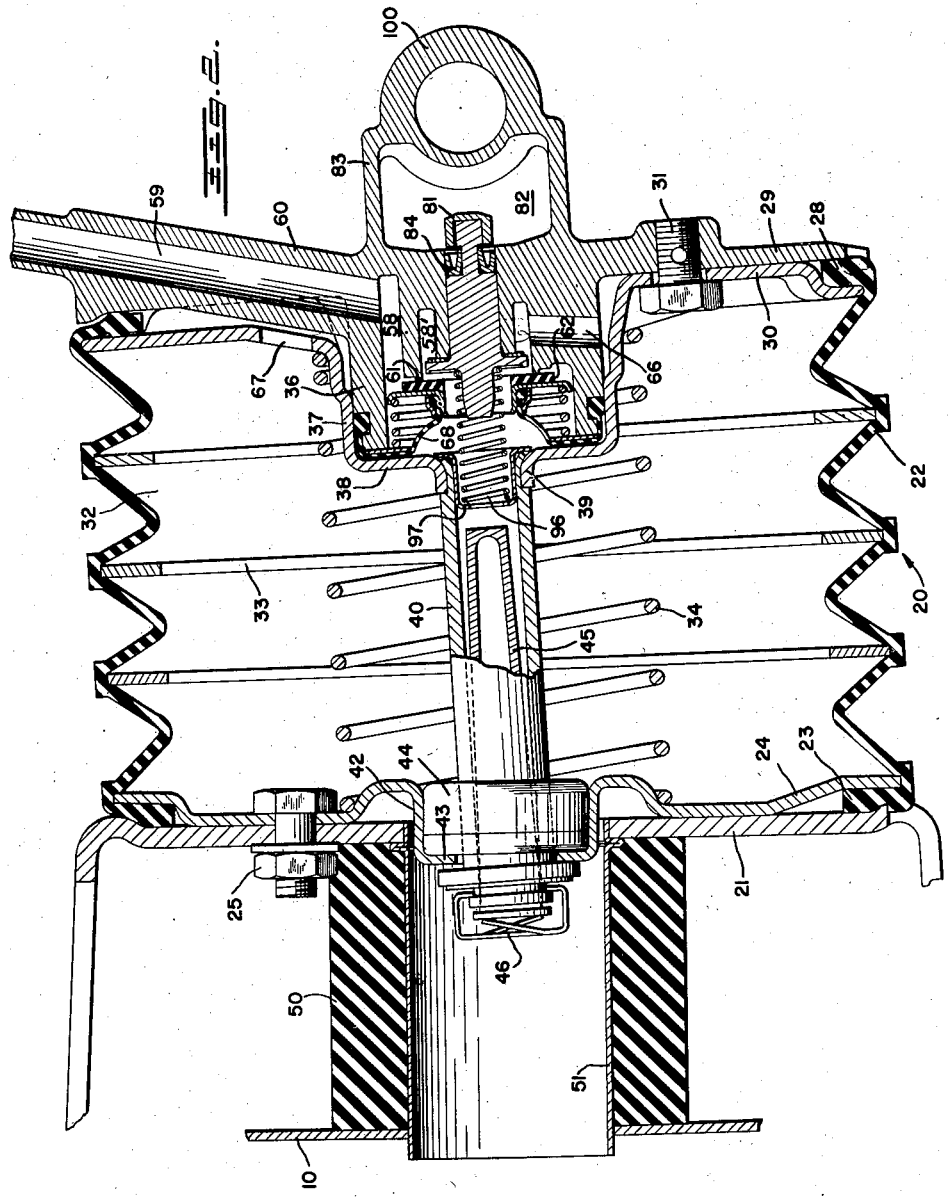

Dec. 2, 1958 D. T. AYERS, JR 2,862,477
FLUID PRESSURE MOTOR VALVE MECHANISM
Filed Oct. 29, 1956 4 Sheets-Sheet 3
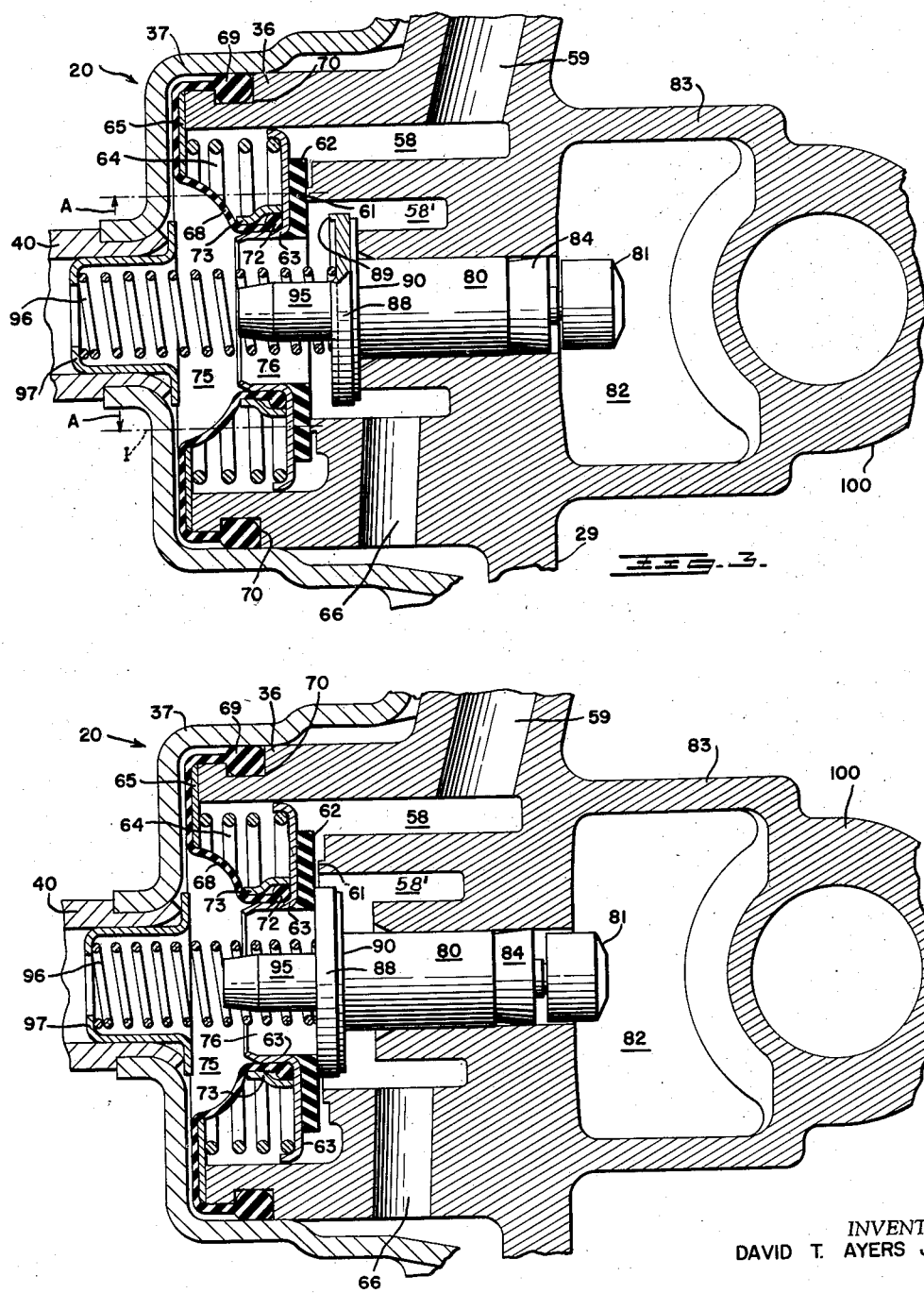
INVENTOR
DAVID T. AYERS JR.
BY *John F. Philips*
ATTORNEY

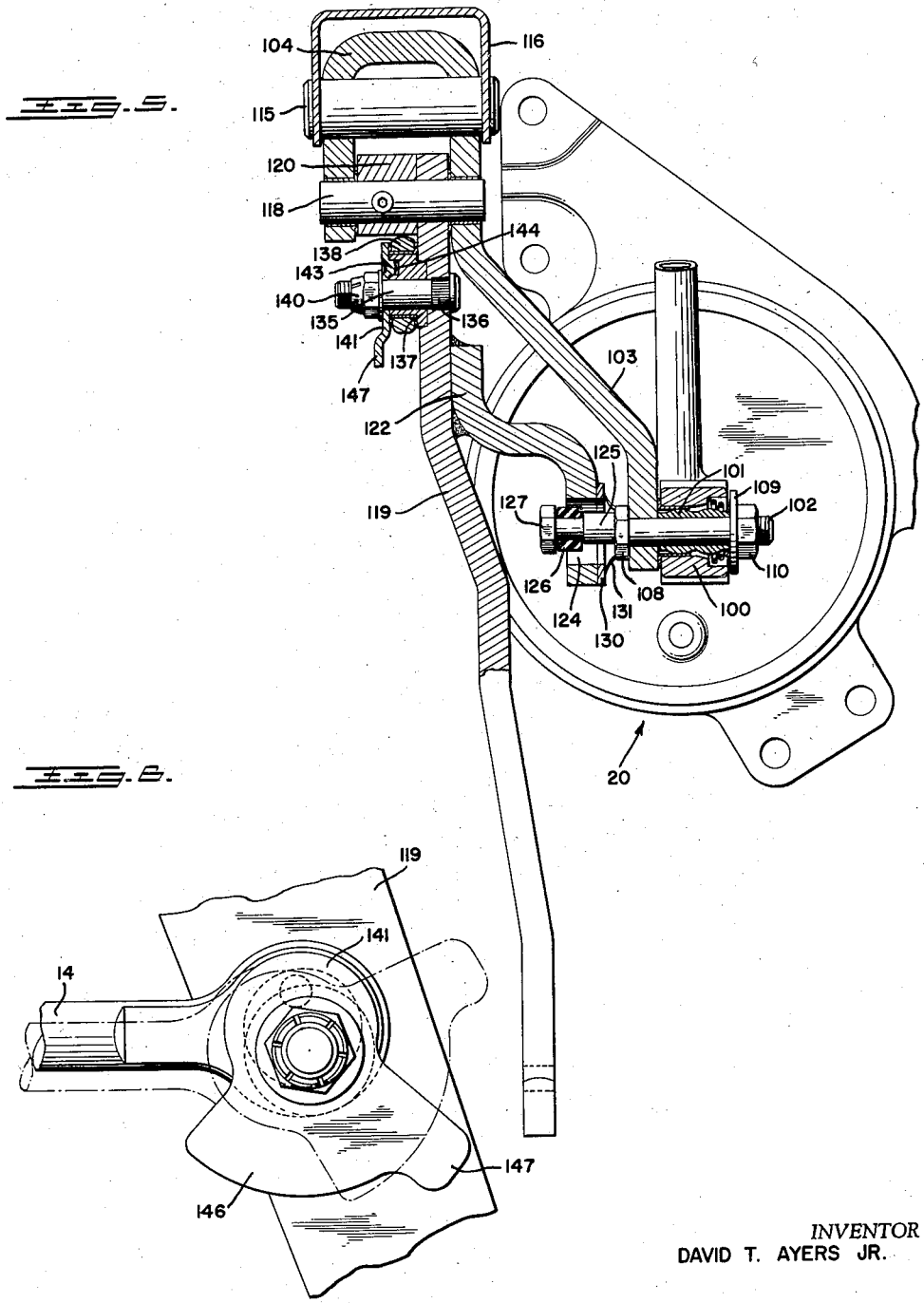

2,862,477
Patented Dec. 2, 1958

2,862,477

FLUID PRESSURE MOTOR VALVE MECHANISM

David T. Ayers, Jr., Birmingham, Mich., assignor to Kelsey-Hayes Company, a corporation of Delaware Application October 29, 1956, Serial No. 618,737

9 Claims. (Cl. 121—41)

This invention relates to a fluid pressure motor and has particular reference to a motor especially adapted for use as a booster motor in a vehicle brake system.

It is now more or less conventional to provide a bellows type booster motor for motor vehicle brake systems, wherein the motor is provided with a stationary head and a movable head carrying a valve mechanism operable by the brake pedal. The movable head has mechanical connection with a power lever associated with the brake pedal to assist the latter in generating braking forces.

The valve mechanisms of motors of the type referred to above generally are either of two types, namely, slide valves or poppet valves. Valves of both types are advantageous in some respects and disadvantageous in others. For example, a slide valve is much easier to operate without opposing differential pressures tending to prevent movement of the valve from a normal off position. Such a valve is disadvantageous, however, because of the difficulty of sealing against leakage around the valves and because of the occasional tendency of such valves to stick when the brakes are released, thus preventing the valves from moving fully and freely to their normal off positions. Poppet valves are advantageous in that they effectively prevent leakage of fluid therearound. However, they are disadvantageous in that, in ordinary installations, a poppet control valve for a motor of this type is held on its seat by differential pressures. As a result, operation of the valve mechanism to energize the booster motor meets a substantial resistance force in operating the valve mechanism, and such force drops off suddenly upon the initial opening of the valve, thus causing a lumpy operation of the brake pedal.

An important object of the present invention is to provide a booster motor of the type referred to wherein the valve mechanism embodies the advantages of both a slide valve and a poppet valve without the disadvantages of either type of valve.

A further object is to provide such a motor wherein the valve itself is subject to differential pressures tending to move it to its normal off position, thereby eliminating any chance that the valve may stick and prevent de-energization of the motor when the valve mechanism is released.

A further object is to provide such a motor wherein the pressure balancing means is in the form of a diaphragm flexibly connecting the valve to the movable head of the motor and serving as a seal between the low and high pressure chambers of the motor.

A further object is to provide a motor of this type wherein the operating means for the valve mechanism comprises a slidable stem biased to a normal off position, and wherein, when the brake pedal is released and the valve parts reach lap position, differential pressures are utilized for assisting the return spring in moving the valve operating stem back to its normal position, thus overcoming any tendency of such stem to stick and prevent proper de-energization of the motor.

Other objects and advantages of the invention will become apparent during the course of the following description.

In the drawings I have shown one embodiment of the invention. In this showing:

Figure 2 is an enlarged sectional view through the motor and associated elements, parts being shown in elevation;

Figure 3 is a still further enlarged fragmentary sectional view of the motor valve mechanism and associated elements, the parts being shown in normal off positions;

Figure 4 is a similar view showing the parts in motor energizing positions;

Figure 5 is a section on line 5—5 of Figure 1; and

Figure 6 is an enlarged side elevation of an adjusting mechanism employed in connection with the pedal lever.

Figure 1:
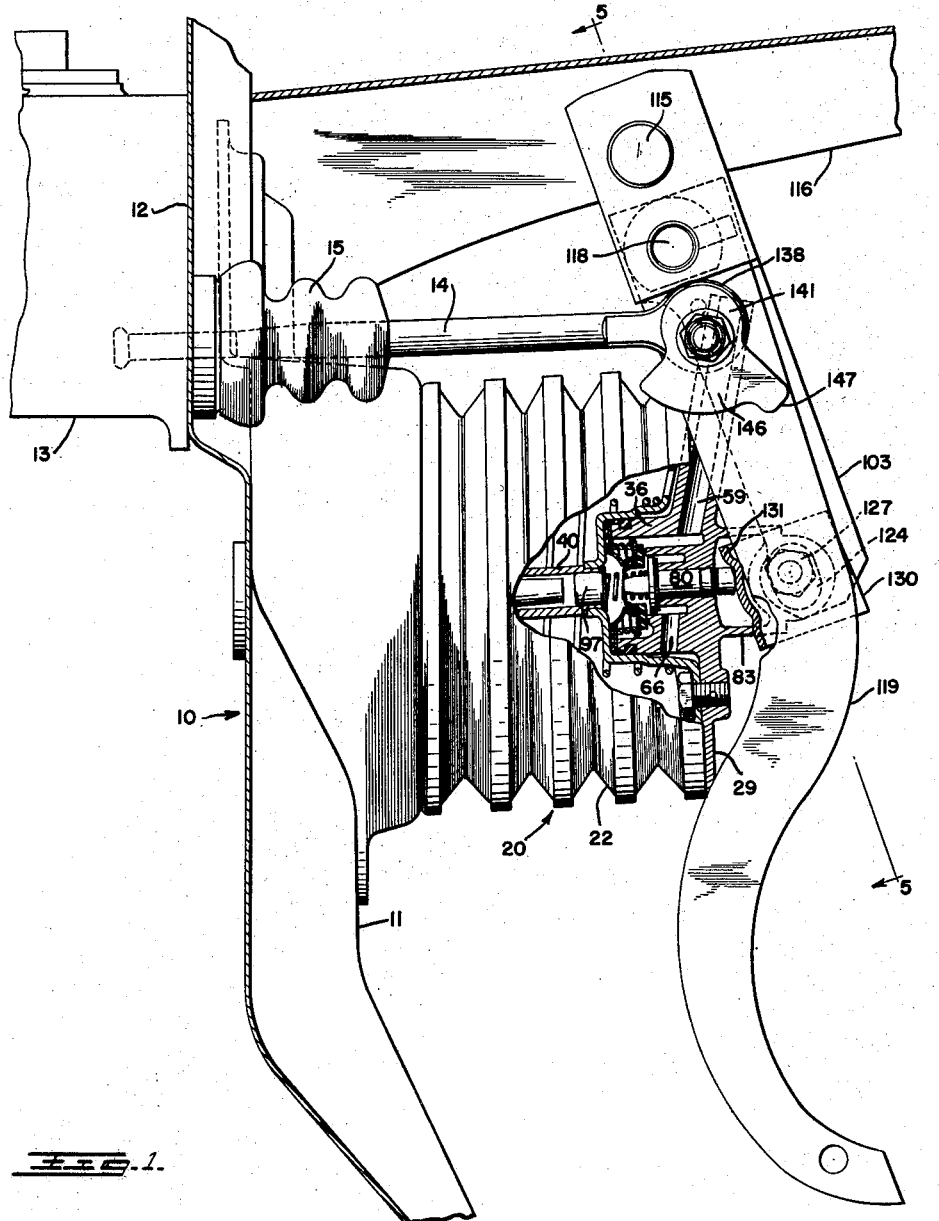
Figure 1 is a side elevation of the brake mechanism, portions of the motor and certain vehicle parts being shown in section.

Referring to Figure 1, the numeral 10 designates the fire wall of the motor vehicle, portions 11 of which are offset rearwardly and an upper portion 12 of which is offset forwardly. In the engine compartment, a master cylinder 13 is fixed to the fire wall portion 12 and is of conventional construction including a conventional fluid displacing plunger (not shown). Such plunger is operable by a push rod 14 surrounded adjacent the fire wall by the usual sealing boot 15.

The device forming the subject matter of the present invention comprises a motor indicated as a whole by the numeral 20 and shown more in detail in Figure 2. The motor comprises a stationary wall 21 formed as a bracket secured in any suitable manner against the rear face of the fire wall 10. The motor further comprises a bellows 22 having at its forward end an inwardly turned bead 23 clamped against the wall 21 by a plate 24 secured to the wall 21 by fastening elements such as bolts 25.

At its rear end, the bellows carries an inwardly turned bead 28 seating against a movable motor wall 29 and clamped in position with respect thereto by a plate 30 secured to the wall 29 by screws 31 or other fastening elements. The motor walls 21 and 29 and bellows 22 cooperate to form an internal chamber 32 in which atmospheric pressure normally is present and which is adapted to be evacuated upon operation of a valve mechanism, to be described, so that atmospheric pressure rearwardly of the wall 29 moves the latter toward the wall 20. The convolutions of the diaphragm are prevented from collapsing by rings 33 corresponding in shape to the cross-sectional shape of the bellows 22, and a return spring 34 biases the movable head 29 to its normal position.

The movable head 29 is preferably formed as a die casting and is provided with a central hub portion 36. The plate 30 extends forwardly as at 37 over the hub portion 36 and then inwardly as at 38 to terminate in an annular flange 39 fixed to an air tube 40.

The plate 24 is provided with a hub portion 42 turned inwardly at its forward end as at 43 to form a flange against which is seated suitable bearing and sealing means 44 mounted in the wall portion 42 and through which the air tube 40 is slidable. The forward end of the air tube is open and, inserted in such end, is a frusto-conical air cleaner 45 which may be formed, for example, of porous bronze. The air cleaner is maintained in position by a suitable clip 46. The specific form of the air tube 43, bearing and sealing means 44, and the air cleaner and the means for holding the air cleaner in position form no part per se of the present invention.

The stationary wall 21 is cushioned with respect to the fire wall 10 by a deformable sleeve 50 surrounding a tube 51 through which the forward end of the air tube 40 is movable when the motor is energized, the tube 51 projecting through the fire wall 10 as shown.

The hub portion 36 of the movable head 29 is provided with a vacuum chamber 58 in fixed communication with a passage 59 formed in a tubular member 60 (Figure 1), preferably cast integral with the head 29 and adapted for connection at its upper end with a vacuum hose (not shown) adapted for connection to a suitable source of vacuum such as the intake manifold of the vehicle engine. Concentrically inwardly of the chamber 58, the hub portion 38 is provided with a variable pressure chamber 58', and communication between the chambers 58 and 58' is controlled by a valve seat 61 engageable by a resilient valve 62 as clearly shown in Figures 3 and 4. This valve is bonded to a metallic cup 63 against which seats one end of a spring 64. The other end of this spring engages against a seat 65 engaging against the forward or left-hand end of the hub portion 36 as viewed in Figures 3 and 4.

The chamber 58' is in fixed communication with the space between the head 29 and plate 30 through a passage 66, and the space referred to communicates with the motor chamber 32 through a port 67 (Figure 2). A diaphragm 68 is connected between the hub portion 36 and the valve 62 and associated elements. This diaphragm extends over the spring seat 65 and then turns inwardly over the left-hand end of the hub 36 and terminates in an enlarged bead 69 arranged in a groove 70 formed in the hub 36. The plate portion 37 engages the bead 69, thus forming a sealing engagement between the plate portion 37 and hub portion 36. The inner end of the diaphragm 68 terminates in a bead 72 surrounding the cylindrical portion of the spring seat 63 and held in position by a clamping ring 73.

The diaphragm 68 forms a fluid seal between the chamber 58 and an air chamber 75 formed within the diaphragm 68 and spring seat 63, and it will be noted that the spring seat 63 and valve 62 have an enlarged axial opening 76 affording constant communication between the air chamber 75 and the variable pressure chamber 58'.

Radially inwardly of the chamber 58', the movable head 29 forms a bearing slidably receiving a stem 80 having a nylon or similar cap 81 arranged in an opening 82 formed in a yoke 83 preferably formed integral with the head 29. Leakage of fluid past the stem 80 is prevented by a preferably double lipped seal 84 surrounding the stem 80.

At its left-hand end as viewed in Figures 3 and 4, the stem 80 carries a disk 88 provided at one side thereof with an annular valve seat 89 larger in diameter than the internal diameter of the valve 62 to be engaged thereagainst upon operation of the stem 80 in a manner to be described. The face of the disk 88 opposite the valve 89 is provided with a resilient washer 90 engageable with the adjacent portion of the movable head 29 to limit movement of the disk 88 to its off position shown in Figure 3.

The stem 80 is provided with a reduced axial projection 95 surrounded by one end of a return spring 96 which engages against the disk 88. The other end of this spring engages a seat 97 fitted in the adjacent end of the air tube 40.

The yoke 83 has formed integral therewith a bearing ring 100 in which is mounted a bearing bushing 101 having a shaft 102 projecting therethrough, and this shaft projects also through the lower offset end of a power lever 103 having its upper end formed in inverted J shape as at 104 (Figure 5). The bearing bushing 102 is provided with two spaced spherical portions. The specific structure of this bushing and the elements connected therewith form per se no part of the present invention and need not be described in detail. The shaft 102 carries a head 108 seated against the lower end of the power lever 103. At the right-hand end thereof, the shaft 102 is provided with a washer 109 and a nut 110 adapted to tighten the washer against the adjacent end of the bushing 101, which in turn is clamped against the lower end of the lever 103.

The upper end portion of the lever 103 is rotatably mounted on a shaft 115 extending through opposite sides of a supporting bracket 116 (Figure 1) fixed to and projecting rearwardly from the fire wall portion 12.

The lever 103 beneath the shaft 115 supports a shaft 118, and this shaft in turn supports the upper end of a pedal lever 119. A filler block 120 is welded or otherwise secured to the upper end of the lever 119 to extend across the space between the arms at the upper end of the power lever 103. The lever 119 has welded thereto a bracket arm 122 the lower end of which is provided with an opening 124 (Figure 5). The shaft 102 is provided with an eccentric extension 125 projecting through the opening 124 and carrying a rubber or similar bushing 126 maintained in position by a head 127. The opening 124 is in the form of a slot wider than the bushing 126 so that upon initial movement of the pedal lever 119 from a normal off position, the bracket arm 122 is movable an appreciable distance independently of the bushing 126.

A valve actuating member 130 is fixed against the right-hand face of the lower end of the bracket arm 122 as viewed in Figure 5. This member has a laterally extending valve operating element 131 (Figure 1) projecting into the opening in the yoke 83 and engageable with the cap 81 of the valve operating stem 80. It will be obvious from Figure 1 that the lower end of the pedal lever 119 will be provided with a conventional pedal pad (not shown) and that upon initial depression of such pedal pad, the valve operating element 131 will move the stem 80 to the left as viewed in Figures 1–4, inclusive.

Except for the adjusting device to be described, the lever mechanism shown in Figures 5 and 6 forms per se no part of the present invention, but is claimed in the copending application of Jeannot G. Ingres, Serial No. 463,492, filed October 10, 1954. In mounting the apparatus in a motor vehicle it is necessary to connect the lever 119 to the push rod 14, and it is desirable to provide some easily adjustable means for connecting these elements together in proper relationship. Such an adjusting device is shown in Figures 5 and 6. The pedal lever 119 at a point spaced below the shaft 118 is provided with a stem 135 having a milled portion 136 extending through the lever 119. The stem 135 supports an eccentric bushing 137 surrounded by a collar 138 formed on the rear end of the push rod 14. The stem 135 carries a nut 140 threaded thereon, and between such nut and the bushing 137 is arranged an adjusting plate 141. This plate is stamped to provide a lateral projection 143 engageable in an opening 144 formed in the bushing 137. The plate 141 is provided with a radially extending portion 146 at one end of which is a radially projecting finger piece 147 employed for turning the plate 141, and consequently the bushing 137, for adjusting purposes as described below.

*Operation*

The apparatus is installed as shown. The bushing 126 (Figure 5) is properly adjusted relative to the opening 124 by turning the shaft 102 to properly position the eccentric 125. The nut 110 is then tightened. The bushing 126 is arranged to the left side of the slot 124, as viewed in Figure 1, to permit the pedal lever 119 to be depressed through a predetermined angle of movement before the right-hand side of the slot 124 engages the bushing 126.

The pedal lever 119 is properly adjusted relative to the rod 14 by turning the finger piece 147 (Figures 5 and 6) with the nut 146 loosened. The projection 143 imparts turning movement to the eccentric 137, and when the parts are properly adjusted, the nut 140 is tightened.

The valve parts normally occupy the positions shown in Figures 1, 2 and 3, the valve seat 89 being spaced from the valve 62 and the latter being engaged with the seat 61. Obviously, the chamber 58' is in constant communication with the motor chamber 32. With the valve mechanism in normal off position, therefore, the air chamber 75 will be in communication with the motor chamber 32. The brake is operated by depressing the brake pedal 119. The valve operating element 131 (Figure 1) is fixed to the pedal lever 119 and accordingly is moved to the left in Figures 1–4, inclusive, and such movement takes place solely against the loading of the spring 96, except for the negligible friction of the stem 80 in its bearing.

The movement referred to takes place until the valve seat 89 engages the valve 62. At such point the valve mechanism will be in lap position, the chamber 58, being disconnected from both the vacuum chamber 58 and the air chamber 75.

Further movement of the brake pedal will then cause the valve seat 89 to move the valve 62 away from the seat 61, thus cracking the chamber 58' to the vacuum chamber 58. The movement necessary to crack the valve 62 takes place against the combined tensions of the springs 64 and 96, and when the valve 62 is cracked, the vacuum chamber 58 will communicate with the variable pressure chamber 58' and thus with the motor chamber 32 to evacuate air therefrom. The valves will now assume the position shown in Figure 4.

Under the conditions referred to, pressure will be lowered in the chamber 32, and atmospheric pressure acting against the outer face of the head 29 will move such head toward the left in Figures 1 and 2, the tube 40 sliding through the bearing and sealing means 44. Movement of the motor head 29 transmits movement through the shaft 102 (Figure 5) to the power lever 103 to rock this lever about the shaft 115. The rocking movement of the power lever also swings the shaft 118 about the axis of the shaft 115, thus bodily moving the upper end of the pedal lever 119 toward the left in Figure 1. The operations referred to take place with the bushing 126 out of engagement with both sides of the opening 124. As the point of maximum energization of the motor 20 is approached, the right-hand side of the slot 124 will approach the bushing 126 and will engage it at the time of maximum energization of the motor. From that point on, both levers 103 and 119 move as a unit, the operator applying force to assist the motor in operating the master cylinder plunger. Until this point is reached, part of the power will be delivered to the lever 119 by the foot and part will be delivered through movement of the shaft 118 by the power lever, the combined forces of the two levers being applied to the operating rod 14. Obviously, the location of the pivot axes of the lever mechanism will predetermine the ratio of work performed by the operator and by the motor, but the operator performs a greater percentage of the work after the point of maximum energization of the motor is reached.

The brakes are released by releasing the brake pedal 119 for return movement to its normal off position. The movable motor head 29 is returned to its normal position by the usual return spring within the motor. The valve 62 is closed relative to the valve seat 61 by the spring 64, while the valve disk 88 is returned to normal position by the spring 96, assisted by differential fluid pressures immediately after the lap position of the valves is reached, as further explained below.

It will be apparent that the diaphragm 68 seals the vacuum chamber 58 from the air chamber 75. When the valve 62 is closed with the parts in off positions, vacuum is present at the right side of the diaphragm 68 while atmospheric pressure is present at the left side. Referring to Figure 3, it will be noted that the broken lines I projected from the mean diameter of the valve seat 61 in Figure 3 define an imaginary circle within the limits of the effective area of the diaphragm 68, that is, the portion lying between the radially inner edge of the plate 65 and the left-hand edge of the clamping ring 63. The lines I lie midway between the adjacent edges of the elements 65 and 73. Outwardly of the imaginary circle through the flexible diaphragm referred to above, differential pressures acting toward the right when the motor 20 is de-energized will be absorbed by the plate 65 and can be disregarded since they will not affect valve 62. The portions of the diaphragm radially inwardly of the imaginary circle referred to will transmit forces to the assembly including the valve 62, and such differential pressure in itself would tend to hold the valve 62 on the seat 61. However, with the parts in off positions, the right-hand face of the valve 62 inwardly of the seat 61 will be open to the atmospheric pressure present in the chamber 60, and such pressure balances pressures acting toward the right on the diaphragm 68 within the imaginary circle referred to.

Thus the valve 62 in the off positions of the parts will be substantially pressure-balanced, with possibly a slight net affective fluid pressure tending to hold the valve 62 on its seat. Such function, however, is performed primarily by the spring 64. Thus, when the valve seat 89, in the initial operation of the motor, engages the valve 62 and then lifts it from its seat, there is no sudden resistance to movement of the stem 80 as usually is necessary in unseating a poppet valve due to pressures tending to seat such valve. Thus it is quite easy to unseat the valve 62 without any lumpiness in the operation of the brake pedal. With conventional poppet valves, a resistance of the character referred to is encountered upon initial unseating of the valve, followed by a sudden drop in differential pressures affecting the valve due to the opening thereof. Such a sudden release in pressure serves to accentuate the pressures encountered in opening a poppet valve of conventional type, thus providing an uneven operation which is highly undesirable in a mechanism of this character. Therefore, the present construction embodies the advantages of poppet valving in that leakage is prevented which normally occurs in slide valves, and yet movement of the valve to operate the motor may be as smoothly performed as is possible with a slide valve.

As previously stated, a further disadvantage of slide valves lies in the fact that when such valve is released to de-energize a fluid pressure motor, there sometimes is a tendency for the valve to stick, thus preventing the valve from promptly moving to its normal off position. In the present device, the valve disk 88 is carried by the stem 80 which might tend to stick when the parts are released if return movement of the valve disk 88 to its normal position depended wholly on the spring 96. The present mechanism utilizes differential pressures for assisting in returning the valve disk 88 to its normal off position.

Referring to Figure 4 in which the valve mechanism is shown in motor operating position, it will be obvious that vacuum is present in the chamber 58'. When the brake pedal is released, the valve disk 88 moves back from the motor energizing position to the lapped valve position with the valve 62 engaging both seats 61 and 89 with vacuum still present to the right of the valve disk 88 as viewed in Figure 4. Atmospheric pressure will act over the entire left side area of the valve disk 88 within the valve seat 89. When the brake pedal is released, therefore, and pressure against the valve stem 80 is completely released, the air pressure acting on the left side of the valve 88 in Figures 3 and 4, while vacuum is present behind the valve disk, will serve to give a very definite impetus to the valve disk 88 to disengage the valve seat 89 from the valve 62 to return the parts to normal position. The differential pressure acting on the valve disk 88 is substantial and greatly assists the spring 96 in returning the stem 80 fully to its normal off position.

From the foregoing, it will be apparent that the valve mechanism for the motor is as easily operable as a slide valve, there being no pressure differentials to overcome in moving the valve mechanism beyond the lap position in energizing the motor. At the same time, the advantage of poppet valving is present in the construction, there being no leakage possible around either of the valve seats when in engagement with the valve 62. Moreover, the spring 96 may be relatively light since it is not wholly depended upon to overcome any sticking of the stem 80 when the parts are returned to normal position, differential pressures being employed for assisting the valve 96 in returning the parts to off positions.

The structure of the device also is highly practicable and economical to manufacture, the entire movable head 29 being made as a die casting and it being necessary merely to smooth the valve seats 61 and 89 without machining any parts of the head 29, such as the walls of the chambers 58 and 58', etc.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor comprising a variable pressure chamber, a pressure responsive unit having one side open to said chamber and having its other side subject to a relatively constant pressure, said pressure responsive unit having an annular low pressure chamber connected to a source of low pressure and a high pressure chamber connected to a source of high pressure, an annular wall having its radially outer face forming the radially inner limit of said low pressure chamber and defining therewithin an annular control chamber, a first annular valve seat carried by said wall, an annular valve normally engaging said first seat, a spring biasing said valve into engagement with said first seat, a diaphragm having radially outer and inner edges respectively sealed relative to said pressure responsive unit and said valve and sealing said low and high pressure chambers from each other, a second annular valve seat movable in one direction into sealing engagement with said valve to close said control chamber and said high pressure chamber from each other and to lift said valve from said first seat, a spring biasing said second valve seat to a position spaced from said valve, and means for transmitting axial movement to said second valve seat to move it in said direction, said valve including a relatively large axial opening therethrough forming a part of said high pressure chamber, said second valve seat having a pressure area subject to pressure in said high pressure chamber whereby when said second valve seat is released after said valve has been moved from said first valve seat, said second valve seat will be subject to differential pressures in said control chamber and in said high pressure chamber to subject said second valve seat to a force tending to move it back to its normal position.

2. A motor according to claim 1 wherein said diaphragm has an effective portion open to pressures in said low pressure chamber and in said high pressure chamber to transmit force tending to seat said valve, said valve, when said second valve seat is in normal position, having a pressure area open to pressure in said control chamber and in said high pressure chamber, which area is approximately equal to said effective area of said portion of said diaphragm to substantially balance pressures tending to engage said valve with said first seat.

3. A motor according to claim 1 wherein said diaphragm has an effective portion open to pressures in said low pressure chamber and in said high pressure chamber to transmit force tending to seat said valve, said valve, when said second valve seat is in normal position, having a pressure area open to pressure in said control chamber and in said high pressure chamber, which area is approximately equal to said effective area of said portion of said diaphragm to substantially balance pressures tending to engage said valve with said first seat, said second valve seat being in the form of a disk having one face open to pressure in said high pressure chamber and its other face open to pressure in said control chamber whereby, after said valve has been moved from said first seat to lower pressure in said motor chamber, said second valve seat will be subjected to differential pressures tending to return it to its normal position.

4. A motor comprising a stationary wall, a movable wall spaced therefrom, a bellows connecting said walls, said stationary wall having an axial hub portion provided therein with a low pressure chamber connected to a source of low pressure, a radially inner control chamber formed in said hub portion and communicating with the interior of said bellows, a first annular valve seat between said chambers, a valve engaging said valve seat and biased into engagement therewith, said movable wall having an axial air chamber, a diaphragm sealed at its radially outer edge relative to said movable wall and at its radially inner edge with respect to said valve and sealing said low and high pressure chambers from each other, a second annular valve seat within and coaxial with said first valve seat and movable in one direction to engage said valve and disconnect said high pressure chamber from said control chamber and to move said valve from said first seat to connect said low pressure chamber to said control chamber, a spring biasing said second valve seat to a normal position spaced from said valve, means for axially moving said second valve seat in said direction, and a disk carrying said second valve seat, said disk having one side open to pressure in said high pressure chamber and its other side open to pressure in said control chamber whereby, when low pressure is established in said control chamber incident to movement of said valve from said first seat, said disk will be subjected to differential pressures tending to return it to its normal position.

5. A motor according to claim 4 provided with a spring biasing said valve for movement into engagement with said first seat, said diaphragm having a radially inner effective pressure portion opposite sides of which are open to pressures in said low pressure chamber and said high pressure chamber respectively to exert a force on said valve to tend to move it toward said first seat, said valve having an area open to pressure in said control chamber equal to said effective portion of said diaphragm to substantially balance the forces thereof when said second valve seat is in normal position whereby said last-named spring exerts the major force tending to hold said valve on said first seat.

6. A motor according to claim 4 provided with a spring biasing said valve for movement into engagement with said first seat, said diaphragm having a radially inner effective pressure portion opposite sides of which are open to pressures in said low pressure chamber and said high pressure chamber respectively to exert a force on said valve to tend to move is toward said first seat, said valve having an area open to pressure in said control chamber equal to said effective portion of said diaphragm substantially to balance the forces thereof when said second valve seat is in normal position whereby said last-named spring exerts the major force tending to hold said valve on said first seat, and a disk on which said second valve seat is formed, said disk having one side open to pressure in said high pressure chamber and its other side open to pressure in said control chamber, whereby, when low pressure is present in said control chamber resulting from said movement of said valve from said first seat, said disk will be subject to differential pressures tending to return it to its normal position.

7. A motor according to claim 4 provided with a spring seat carrying said valve, a flat annular spring seat carried by said pressure responsive unit, and a spring arranged between said seats to bias said valve into engagement with said first seat, said diaphragm extending over said second-named valve seat and inwardly into sealing engagement with said first-named valve seat, said diaphragm having an effective pressure portion inwardly of said second-named valve seat open to pressures in said high and low pressure chambers respectively to transmit a force to said first-named spring seat tending to engage said valve with said first valve seat.

8. A fluid pressure motor comprising a variable pressure motor chamber, a pressure responsive unit having one side open to said chamber, said pressure responsive unit having a pair of chambers one of which is a low pressure chamber and the other of which is a high pressure chamber connected respectively to sources of low and high pressures, a control chamber formed within one chamber of said pair and communicating with said motor chamber, a first valve seat between said control chamber and said one chamber, a valve biased into engagement with said seat, a second valve seat engageable with said valve to move it from said first seat, said second valve seat being normally spaced from said valve, a stem slidably supported within said pressure responsive unit for movement with said seats by which said second seat is carried, means biasing said second seat to said normal position, and a diaphragm sealed with respect to said valve and said pressure responsive unit and sealing the chambers of said pair from each other, said valve including a relatively large opening therethrough forming a part of said high pressure chamber, said second valve seat having a pressure area subject to pressure in said high pressure chamber whereby when said second valve seat is released after said valve has been moved from said first valve seat, said second valve seat will be subject to differential pressures in said control chamber and in said high pressure chamber to subject said second valve seat to a force tending to move it to its normal position.

9. A fluid pressure motor comprising a variable pressure motor chamber, a pressure responsive unit having one side open to said chamber and having its other side subject to a relatively constant pressure, said pressure responsive unit having a low pressure chamber connected to a source of low pressure and a high pressure chamber connected to a source of high pressure, a wall having an outer face forming the inner limit of said low pressure chamber and defining therewithin a control chamber, a first valve seat carried by said wall, a valve normally engaging said first valve seat, a spring biasing said valve into engagement with said first seat, a diaphragm having outer and inner edges respectively sealed relative to said pressure responsive unit and said valve and sealing said low and high pressure chambers from each other, a second valve seat movable in one direction into sealing engagement with said valve to close said control chamber and said high pressure chamber from each other and to lift said valve from said first seat, a spring biasing said second valve seat to a normal position spaced from said valve, and means for transmitting movement to said second valve seat to move it in said direction, said valve including a relatively large axial opening therethrough forming a part of said high pressure chamber, said second valve seat having a pressure area subject to pressure in said high pressure chamber whereby, when said second valve seat is released after said valve has been moved from said first valve seat, said second valve seat will be subject to differential pressures in said control chamber and in said high pressure chamber to subject said second valve seat to a force tending to move it back to its normal position.

References Cited in the file of this patent
UNITED STATES PATENTS

| | | |
|---|---|---|
| 1,960,481 | Monge | May 29, 1934 |
| 2,207,700 | Porter | July 16, 1940 |
| 2,792,686 | Ingres | May 21, 1957 |